Oct. 12, 1971   R. A. HOLMES ET AL   3,611,710

GRAB LINK

Filed Oct. 9, 1968

INVENTORS.
RALPH A. HOLMES
HAROLD F. HOLMES
BY Eugene M. Eckelman
ATTY.

United States Patent Office 3,611,710
Patented Oct. 12, 1971

3,611,710
GRAB LINK
Ralph A. Holmes, 11505 NE. Glisan, Portland, Oreg. 97220, and Harold F. Holmes, Box 248, South Coos River, Coos Bay, Oreg. 97420
Filed Oct. 9, 1968, Ser. No. 766,140
Int. Cl. F16g 15/00
U.S. Cl. 59—93      1 Claim

ABSTRACT OF THE DISCLOSURE

A grab link having a body portion with an opening therein shaped such that one defining wall of the opening forms a widened pulling edge for a strap adapted to be connected to the link. The body portion of the link has a slot leading from the opening arranged to detachably receive a chain link or the like in a grab connection. The grab link is intended to provide a quick connection between a strap-type sling or a load binding strap and a chain.

BACKGROUND OF THE INVENTION

Strapping material of nylon or similar construction is being used more everyday for load binding, slings, and the like. Such strapping has the advantage over chains or ropes that it does not damage articles of freight into which it comes in contact. However, in the conversion from chain ties to strapping, the existing connecting means such as the chains, load binders, and the winches must be replaced since the strapping by its widened construction is not usable with chain hardware such as shackles, links, and the like. It is thus necessary for operators to expend unnecessary sums in converting from chains to strapping.

SUMMARY OF THE INVENTION

Accordingly, the invention has as a primary objective thereof to provide a grab link which is arranged in its structure to provide a connection between a chain and the widened type strapping, whereby portions of existing chain binding equipment need not be replaced.

A more particular object of the invention is to provide a grab link having a body portion provided with an opening a defining wall of which forms a pulling edge for strapping comprising a part of binding means, said body portion also having a slot extending from said opening and dimensioned and arranged to receive a chain link edgewise in a grab connection, whereby to provide a pulling connection for a chain, also comprising a part of the binding means, in a direction opposite from the pulling connection of the strap.

The invention will be better understood and additional objects and advantages will become apparent from the following description which illustrates preferred forms of the device.

DESCRIPTION OF THE PREFERRED EMBODIMENT

Figure 1:
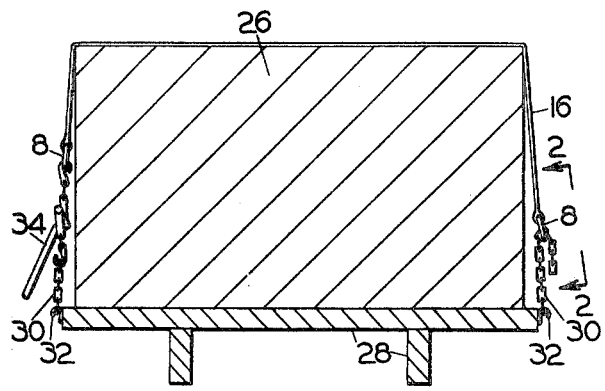
FIG. 1 is a sectional view through a load showing binding means comprising an arrangement of chains and a load binding strap using the instant grab link.
Figure 2:
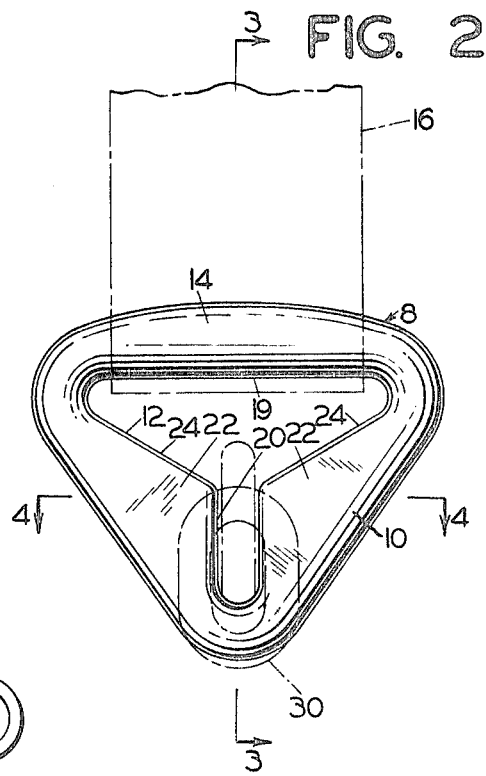
FIG. 2 is a face view of the present grab link taken on the line 2—2 of FIG. 1, a portion of a chain connected thereto being shown in phantom lines.
Figure 3:
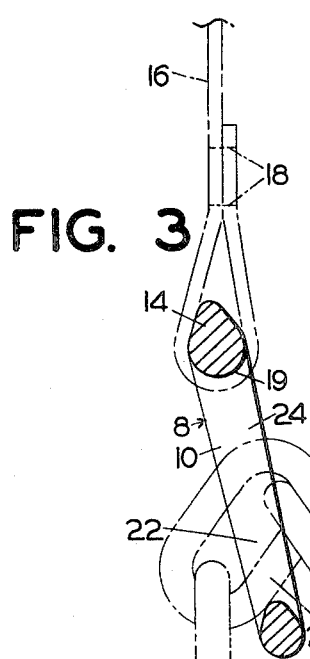
FIG. 3 is a sectional view taken on the line 3—3 of FIG. 2.

Referring in particular to the drawings, and first to FIGS. 1-4, a first form of grab link 8 of the present invention comprises a plate-like body portion 10. Although this body portion may assume any desired shape, it preferably is triangular as viewed from its face surfaces to minimize the amount of material in its structure.

Body portion 10 has an opening 12 defined at one end by a wall 14. Opening 12 extends across a wide portion of the body portion 10 in order that the wall 14 can accommodate regular widths of strapping 16. To connect the strap, it is looped over the wall 14 and is stitched or otherwise connected to itself at 18 to form the attaching loop. Wall 14 is generally rounded on its inner edge portion 19, FIG. 3, to avoid damaging the strap 16.

Body portion 10 also has a slot 20 leading from the opening 12 at right angles thereto. This slot is adapted to receive a chain link edgewise in a grab connection whereby a detachable pulling connection in a direction opposite from the pulling connection with the strap 16 is provided. As apparent in FIG. 4, the body portion 10 tapers to a thinner construction toward the slot 20 to insure that the thickness at the slot is less than the length of a link of chain to be connected thereto in order that said link can be inserted edgewise into the slot, the said tapered areas of the body portion being designated by the numeral 22. In other words, the body portion in order to withstand the pulling forces under maximum load conditions must be of substantial thickness, and to insure that the link can have attachment with any type of chain, the tapered areas 22 are provided. The tapered construction does not weaken the body portion since the peripheral areas of the latter are maintained at a rugged thickness.

The opening 12 is of sufficient dimension to allow a chain to move lengthwise therethrough so that a selected link can be inserted in the slot 20. In a preferred construction, defining side walls 24 of the opening 12 lead angularly away from the defining walls of the slot 20 to form an enlarged portion of the opening 12 adjacent the open end of slot 20. The angled edges 24 also serve to direct a chain link into the slot 20.

One particular adaptation of the present invention is illustrated in FIG. 1 wherein the strap 16, which forms a part of load binding means, extends over a load 26 on a vehicle 28. The strap 16 is provided with one of the present links 8 at each of its ends which are adapted to be connected to selected links of chains 30, the chains being suitably connected at their other ends to the bed of the vehicle as by hook means 32 and forming other parts of the binding means. One of the chains 30 may incorporate an over-center load binder 34 therein for tightening the strap on the load.

A binding assembly of FIG. 1 may be made up new, comprising two chain sections and a center strap section 16, or an existing full length binding chain could be converted into a combination strap and chain binder. Such combination strap and chain binder provides for easy connection to the vehicle, and the strap, being engageable with the load, minimizes damage to the load. The present grab link allows binding chain equipment to be readily converted to a combination strap and chain binder since the operator already possesses the over-center load binder 34 and sufficient chain, as well as the necessary attaching means on the truck, such as the hooks 32.

It is to be understood that the grab link 8 and strapping 16 may be used in combination with tie down means other than chains. For example, rope may be used instead of chains wherein such rope would have end ferrules capable of detachable connection to the link by placing the rope in the slot 20 so that the ferrule will catch behind one side of the link. Although the present invention has been shown and described in connection with load binding, it could as well be used with other structures such as slings.

Figure 6:
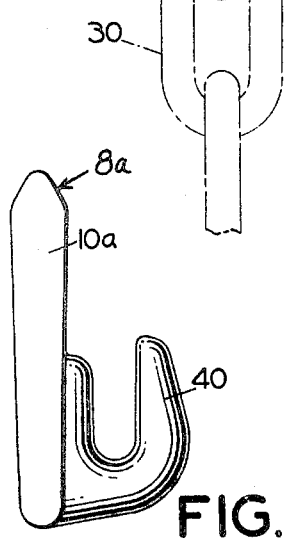
FIG. 6 is a side edge view of the link of FIG. 5.
Figure 5:
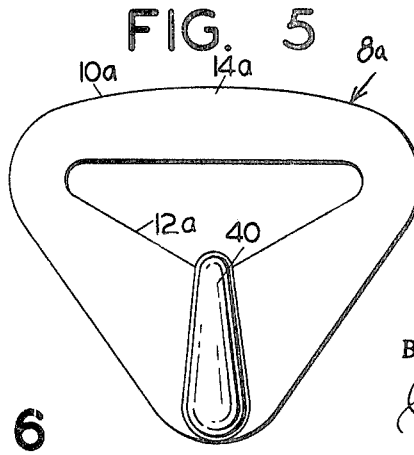
FIG. 5 is a face view of a modified form of the instant grab link.

FIGS. 5 and 6 show another form of the present link, designated generally by the numeral 8a. The body portion 10a in this embodiment has substantially the same structure as the body portion 10 in FIG. 2, having the opening 12a and strap holding wall 14a. This embodiment, however, does not employ the slot 20 but instead the chain connecting portion comprises a grab hook 40 projecting laterally from and forming an integral part of the body portion 10a. The hook 40 serves the same purpose as the slot 20 in the embodiment of FIG. 1, and thus is on the end opposite from the wall 14a to achieve an opposite pull between the chain and the strapping.

Figure 7:
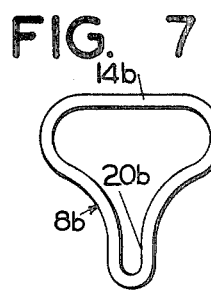
FIG 7 is a face view of another embodiment of the link.
Figure 4:
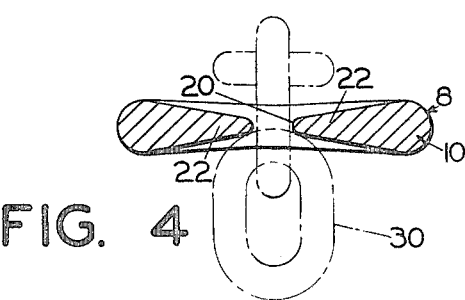
FIG. 4 is a sectional view taken on the line 4—4 of FIG. 2.
Figure 8:
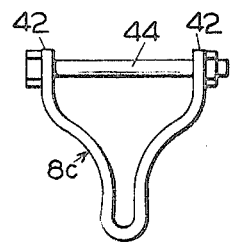
FIG. 8 is a face view of still another embodiment of the link.

FIGS. 7 and 8 show still further forms of the invention. In FIG. 7 the grab link 8b, rather than being cast or otherwise assuming a plate-like configuration, is constructed of heavy wire stock. The body 8b, similar to FIG. 2, has a portion 14b for connection to a strap and is formed so as to have a slot 20b for receiving a chain link. The grab link 8c of FIG. 8 is similar to the embodiment of FIG. 7 except that the wire has terminal ends 42 at the wide portion of the link and the opening between these terminal ends is closed by a bolt or pin 44 mounted in the body portion of the link adjacent said terminal ends. The bolt 44 forms the connecting wall for the strapping.

It is to be understood that the forms of our invention herein shown and described are to be taken as preferred examples of the same and that various changes in the shape, size and arrangement of parts may be resorted to without departing from the spirit of our invention or the scope of the subjoined claims.

Having thus described our invention, we claim:

1. A grab link for connecting a strap portion of binding means to another portion of binding means of the type including a longitudinal segment and at least one laterally extending segment, comprising:
   (a) a body portion having a plate-like construction,
   (b) said body portion having an opening therethrough inwardly of its sides but adjacent one end,
   (c) a defining wall of said opening at said one end of the housing forming a pulling edge,
   (d) said pulling edge being of sufficient width to permit connection thereto of the strap portion and arranged to accommodate pulling by said strap portion in one direction,
   (e) said body portion having a slot therein disposed inwardly of its sides but adjacent the opposite end of said housing from said opening,
   (f) said opening and slot communicating with each other,
   (g) the thickness of said body portion being tapered from each side to a thinner construction adjacent said slot,
   (h) two other defining walls of said opening leading angularly away from said wall at the one end to form an enlarged portion of said opening at said slot,
   (i) said slot being dimensioned and arranged to have detachable locked connection with the laterally extending segment of the binding means by hooked engagement of the laterally extending segment behind one side of the slot whereby to provide a detachable connection between a strap and the portion of the binding means having the lateral segment,
   (j) said opening being of sufficient size to permit longitudinal movement therethrough of the portion of the binding means which includes the laterally extending segment whereby to accomplish said hooking engagement.

References Cited

UNITED STATES PATENTS

| | | | |
|---|---|---|---|
| 612,138 | 10/1898 | Reeve | 59—93 |
| 1,528,798 | 3/1925 | Stenman | 24—116 |
| 2,433,567 | 12/1947 | Lofgren | 59—93 |
| 2,570,680 | 10/1951 | Huizinga | 24—116 |
| 2,904,347 | 9/1959 | Tucker | 24—116 |
| 3,224,185 | 12/1965 | Grim | 59—86 |
| 3,282,045 | 11/1966 | Thelan | 59—93 |
| 3,335,468 | 8/1967 | Harley | 24—116 |
| 3,343,862 | 9/1967 | Holmes | 294—74 |

FOREIGN PATENTS

| | | | |
|---|---|---|---|
| 61,972 | 6/1925 | Sweden | 59—93 |

CHARLES W. LANHAM, Primary Examiner

G. P. CROSBY, Assistant Examiner

U.S. Cl. X.R.

24—116 R; 294—74